United States Patent Office 3,786,154
Patented Jan. 15, 1974

3,786,154
COMPOSITIONS AND METHOD EMPLOYING 1-[4-HYDROXY - 3'-(HYDROXYMETHYL)-PHENYL]-1-HYDROXY-2-ARALKYLAMINOETHANES
John T. Suh, Mequon, and Thomas M. Bare, Milwaukee, Wis., assignors to Colgate-Palmolive Company, New York, N.Y.
No Drawing. Continuation-in-part of application Ser. No. 150,220, June 4, 1971, now Patent No. 3,700,692. This application Oct. 19, 1972, Ser. No. 298,841
Int. Cl. A61k 27/00
U.S. Cl. 424—282    6 Claims

ABSTRACT OF THE DISCLOSURE

Pharmaceutical compositions containing $\alpha^1$-[[($\alpha$-methyl - 3,4 - methylenedioxyphenethyl)amino] - methyl]-4-hydroxy-m-xylene-$\alpha^1,\alpha^3$-diol are useful in producing bronchodilation in animals.

RELATED CASE

This application is a continuation-in-part of our earlier application, Ser. No. 150,220 filed June 4, 1971, now U.S. Pat. No. 3,700,692.

BACKGROUND OF THE INVENTION

The most widely used bronchodilators, such as isoproterenol, are not orally effective and have the disadvantage of being potent cardiac muscle stimulants. The compounds $\alpha$-(3,4-dihydroxyphenyl)-$\beta$-(3',4'-methylenedioxyphenyl)-isoproylamino ethanol, disclosed in U.S. Pat. No. 3,139,441, is orally effective as a bronchodilator but is a potent cardiac stimulant. Hydroxymethylated sympathomimetic amines have been disclosed which are bronchodilators and cardiac stimulants. D. Hartley et al., Nature, 219, 861 (1968), and D. T. Collin et al., J. Med. Chem., 13, 674 (1970).

DETAILED DESCRIPTION OF THE INVENTION

The compounds of the present invention have the following formula:

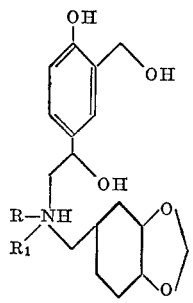

in which R and R₁ are hydrogen or lower alkyl of 1 to 4 carbons such as methyl, ethyl, isopropyl and butyl.

It is an object of the present invention to disclose 1-[4'-hydroxy-3'-(hydroxymethyl)-phenyl] - 1 - hydroxy-2-aralkylaminoethanes, which are orally effective, long-acting and selective bronchodilators.

The compound $\alpha^1$-[[($\alpha$-methyl - 3,4 - methylenedioxyphenethyl) - amino]methyl] - 4-hydroxy-m-xylene-$\alpha^1,\alpha^3$-diol is representative of the novel compounds and it is preferably prepared by reacting 2-benzyloxy-5-bromo-acetylbenzyl acetate with $\alpha$-methyl-3,4-methylenedioxyphenethylamine in an inert solvent such as tetrahydrofuran at a temperature of about 40°. When the reaction is complete, the mixture is acidified with hydrochloric acid to form the compound 2-benzyloxy-5-($\alpha$-methyl-3,4-methylenedioxyphenethylaminoacetyl)-benzyl acetate hydrochloride. The benzylacetate is then hydrolyzed in the presence of a dilute acid such as dilute hydrochloride acid to form 2-benzyloxy-5-($\alpha$-methyl - 3,4 - methylenedioxy-phenethylaminoacetyl)-benzyl alchol, which is hydrogenated to form $\alpha^1$-[[($\alpha$-methyl-3,4-methylenedioxyphenethyl)amino]methyl]-4-hydroxy-m-xylene-$\alpha^1,\alpha^3$-diol.

The hydrogenation is preferably conducted in the presence of a platinum or palladium catalyst at hydrogen pressure of 40–60 p.s.i. and a temperature of from room temperature to about 50° C. The reaction is considered complete when the hydrogen uptake has leveled off or ceased.

The described method of preparation may be illustrated as follows:

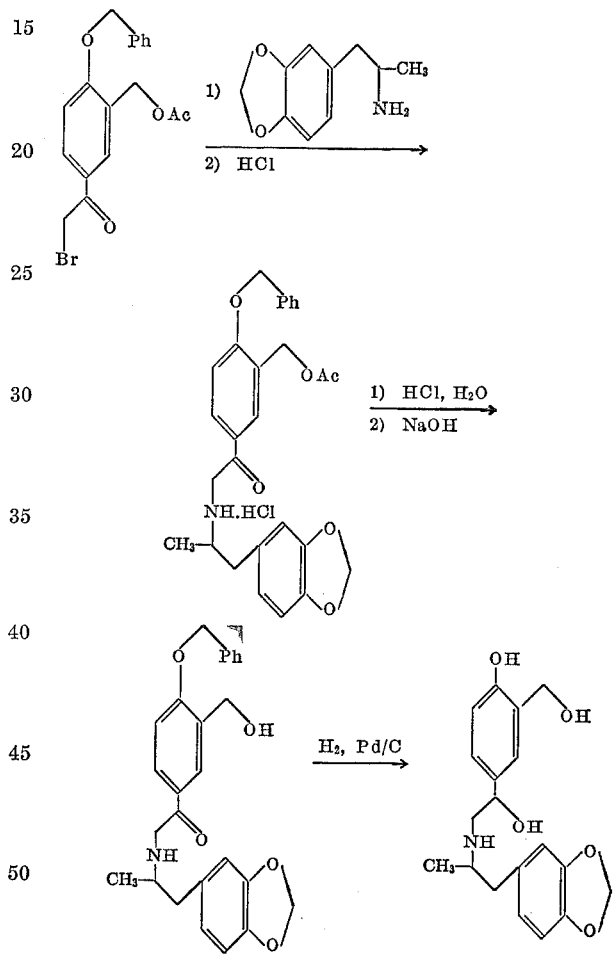

Among the other compounds of the invention which may be prepared in an analogous manner are:
$\alpha^1$-[[(3,4 - methylenedioxyphenethyl)amino]methyl]-4-hydroxy-m-xylene-$\alpha^1,\alpha^3$-diol,
$\alpha^1$ - [[($\alpha,\alpha$ - dimethyl - 3,4 - methylenedioxyphenethyl) amino]methyl]-4-hydroxy-m-xylene-$\alpha^1,\alpha^3$-diol,
$\alpha^1$ - [[($\alpha$ - ethyl - 3,4 - methylenedioxyphenethyl)amino]methyl]-4-hydroxy-m-xylene-$\alpha^1,\alpha^3$-diol, and
$\alpha^1$ - [[($\alpha$ - isopropyl - 3,4 - methylenedioxyphenethyl)amino]methyl]-4-hydroxy-m-xylene-$\alpha^1,\alpha^3$-diol.

The compound $\alpha^1$-[[($\alpha$-methyl-3,4-methylenedioxyphenethyl)amino]methyl]-4-hydoxy-m-xylene-$\alpha^1,\alpha^3$-diol is the preferred compound and it exists in the form of two diastereomeric isomers. The described method of preparing the compound results in a mixture of two isomers having different melting points. The high melting isomer may be isolated from the low melting isomer in a substantially pure form by forming the nitrate salts of the two isomers and selectively precipitating the nitrate salts from a solvent such as anhydrous ether. The high melting isomer precipitates first and can be purified, if desired, by recrystallization from a suitable solvent such as 2-propanol. The purified high melting isomer is a white solid which has a melting point of about 127–135° C.

Both of the diastereoisomers, as well as the mixture of the isomers of $\alpha^1$-[[($\alpha$-methyl-3,4-methylenedioxyphenethyl)amino]methyl]-4-hydroxy-m-xylene-$\alpha^1$,$\alpha^3$ - diol, are orally effective as bronchodilators and produce a more potent and sustained bronchodilation than isoproterenol. Furthermore, both isomers have less undesirable side effects on the contractile forces and heart rate of test animals than does isoproterenol.

Pharmaceutical compositions will generally contain the novel compounds as a mixture of diastereoisomers or optical isomers if more than one form exists. Such compositions may take the form of tablets, capsules, solutions or suspensions for oral administration or solutions for inhalation or parenteral administration. The active ingredients are generally employed in the form of their free bases. However, they may be employed in the form of their acid addition salts such as the nitrates, the hydrochlorides, the sulfates and the like. In addition to the active ingredients, the compositions will usually contain conventional pharmaceutical diluents and excipients.

The individual dosage forms may contain from about 0.02 mg. or less of the active ingredient calculated as the free base to more than 10 mg. Generally, the daily dose will be equivalent in terms of the free base to an intraperitoneal dose of from about 2 mg./kg. to about 200 mg./kg. of body weight.

The invention is further illustrated by the examples which follow.

EXAMPLE 1

3-chloromethyl-4-hydroxyacetophenone

Hydrogen chloride gas is bubbled through a stirred, cooled (20°) mixture of 40.0 g. (0.294 mole) of p-hydroxyacetophenone, 86.5 g. (1.07 moles $CH_2O$) of 37% aqueous formaldehyde, and 360 g. of concentrated hydrochloric acid for 6 hours. The resulting mixture is poured with continuous stirring into 1800 ml. of ice water and the resulting pale red precipitate collected, washed thoroughly with water, dissolved in ether, dried over $MgSO_4$, and concentrated to leave a tan solid. Recrystallization from ethyl acetate gives 3-chloromethyl-4-hydroxyacetophenone as a tan solid, M.P. 166°.

EXAMPLE 2

5-acetyl-2-hydroxybenzylacetate

A stirred mixture of 40.0 g. (216 mmoles) of the compound of Example 1 and 25.8 g. (263 mmoles) of potassium acetate in 90 ml. of glacial acetic acid is seated for 3 hours at 100°. The resulting mixture is poured into water and extracted with methylene chloride. The combined organic extracts are washed with water, diluted with benzene, dried over $MgSO_4$, filtered, and concentrated to leave a tan solid which is recrystallized from ethyl acetate to leave 5-acetyl-2-hydroxybenzylacetate as tan crystals, M.P. 111–112°.

EXAMPLE 3

5-acetyl-2-hydroxybenzylalcohol

A solution of 41.6 g. (0.20 mole) of the benzyl acetate of Example 2 and 0.15 g. of p-toluenesulfonic acid in 230 ml. of methanol is heated to reflux and the methyl acetate-methyl alcohol distillate was slowly removed through a Vigreux column using a high reflux ratio. When 70 ml. of distillate has been collected (6.5 hours), the reaction mixture is concentrated, poured into water, and extracted with ether. The combined ether extracts arew ashed successively with water, dilute aqueous sodium carbonate, and water, dried over $MgSO_4$, filtered, and concentrated to leave a brown oil. A small volume of ethyl acetate is added and the resulting mixture placed in the refrigerator overnight. The resulting crystals are collected and dried to give 5-acetyl-2-hydroxybenzylalcohol as a tan solid, M.P. 120.5–121.5°.

EXAMPLE 4

5-acetyl-2-benzyloxybenzylalcohol

To a cold stirred solution of 5-acetyl-2-hydroxybenzylalcohol (14.56 g. or 87.8 mmoles) in 140 ml. of acetone is added a solution of 6.71 g. of (93.5 mmoles) of 85% potassium hydroxide in 8.2 ml. of water. The potassium salt separates as a yellow precipitate and after standing in the cold for 1 hour, is collected and air-dried. The potassium salt is then refluxed under nitrogen with 15.0 g. (87.8 mmoles) of benzyl bromide and 90 ml. of absolute ethanol for 6 hours. The separated potassium bromide is separated by filtration and the filtrate concentrated to a total volume of ca. 60 ml. On cooling, tan crystals separate and these are collected, washed with cold ethanol-n-heptane, and dried to give 5-acetyl-2-benzyloxybenzylalcohol as pale tan needles, M.P. 124–125°. An additional amount of tan needles, M.P. 122.5–124°, are isolated from the mother liquor by concentration and recrystallization of the residue from ethanol.

EXAMPLE 5

5-acetyl-2-benzyloxybenzyl acetate

A solution of 28.80 g. (112 mmoles) of 5-acetyl-2-benzyloxybenzyl alcohol in 65 ml. of pyridine and 32 ml. of acetic anhydride is heated at 95–100° for 0.5 hour. The resulting solution is cooled, poured into 300 ml. of water and diluted with solid sodium bicarbonate until gas evolution ceases. The resulting mixture is extracted with ether and the combined ether extracts are washed successively with dilute hydrochloric acid (until the washes are acidic), water, and dilute sodium bicarbonate. The ether layer is dried over $MgSO_4$, filtered, and concentrated to leave a pale orange oil which slowly crystallizes. The solid is recrystallized from a small amount of ethanol to give 5-acetyl-2-benzyloxybenzyl acetate as pale tan crystals, M.P. 51.5–52.5°.

EXAMPLE 6

2-benzyloxy-5-bromoacetylbenzyl acetate

To a stirred solution of 5-acetyl-2-benzyloxybenzyl acetate (31.10 g. or 104 mmoles) in 500 ml. of anhydrous ether is added ca. 0.05 g. of aluminum chloride and 16.7 g. (104 mmoles) of bromine (dropwise). The resulting mixture is filtered through Celite and concentrated to leave a white solid which is dissolved in an ether-methylene chloride mixture. The organic material is washed with dilute aqueous sodium bicarbonate, dried over $MgSO_4$, filtered, and concentrated to leave a white solid which is recrystallized from a small volume of ethanol to give 2-benzyloxy-5-bromoacetylbenzyl acetate as white needles, M.P. 89–90°.

EXAMPLE 7

2-benzyloxy-5-[($\alpha$-methyl-3,4-methylenedioxyphenethyl) aminoacetyl]-benzyl acetate hydrochloride To a cold stirred solution of 6.99 g. (0.39 mmoles) of $\alpha$-methyl-3,4-methylenedioxyphenethylamine in 13 ml. of tetrahydrofuran (THF) is added dropwise a solution of 7.00 g. (18.6 mmoles) of bromoketone in 28 ml. of THF. The solution is heated to 40–45° for 1.5 hours, whereupon a white precipitate forms. The mixture is cooled and filtered to separate 4.12 g. (85.5%) of $\alpha$-methyl-3,4-methylenedioxyphenethylamine hydrobromide. The filtrate is concentrated to give a brown oil which is dissolved in 10 ml. of ethanol and acidified with ethereal hydrochloric acid. The resulting precipitate is collected, washed with ethanolether, and dried to give 2-benzyloxy-5 - [($\alpha$ - methyl - 3,4-methylenedioxyphenethyl)aminoacetyl]-benzyl acetate hydrochloride as a tan solid, M.P. 140–141°.

EXAMPLE 8

2-benzyloxy-5-[(α-methyl-3,4-methylenedioxyphenethyl) aminoacetyl]-benzyl alcohol A stirred mixture of 4.20 g. (8.21 mmoles) of the benzyl acetate of Example 7, 50 ml. of dilute hydrochloric acid (5 ml. concentrated HCl+45 ml. water), and 30 ml. of methanol is heated at 80–85° for 1 hour. The solution is cooled, made basic with aqueous sodium hydroxide, and diluted with 30 ml. of ether. Vigorous stirring eventually solidifies the precipitated oil and, on filtration, a tan solid is collected. Recrystallization of the solid from methanol gives 2 - benzyloxy - 5-[(α - methyl-3,4-methylenedioxyphenethyl)aminoacetyl]-benzyl alcohol as a tan solid, M.P. 83°.

EXAMPLE 9

α$^1$-[[(α-methyl-3,4-methylenedioxyphenethyl)amino] methyl]-4-hydroxy-m-xylene-α$^1$,α$^3$-diol A mixture of 5.65 g. (13.0 mmoles) of the aminoketone of Example 8, 0.60 g. of 10% Pd./C, and 60 ml. of methanol is hydrogenated on the Parr shaker for 13 hours. The resulting mixture is filtered and concentrated to leave a white foam which, upon dissolving in 15 ml. of ethyl acetate and scratching with a glass rod, deposits a white solid, M.P. 90°. Recrystallization by dissolving in a small amount of acetone and diluting with ethyl acetate gives α$^1$ - [[(α - methyl - 3,4-methylenedioxyphenethyl) amino]methyl]-4-hydroxy-m-xylene-α$^1$,α$^3$-diol as a white solid, M.P. 91°.

*Analysis.*—Calcd. for $C_{19}H_{23}NO_5$ (percent): C, 66.07; H, 6.71; N, 4.06. Found (percent): C, 66.17; H, 6.62; N, 3.99.

EXAMPLE 10

α$^1$-[[(α-methyl-3,4-methylenedioxyphenethyl)amino] methyl]-4-hydroxy-m-xylene-α$^1$,α$^3$-diol nitrate A stirred solution of 5.6 g. (0.0163 mole) of α-[[(α-methyl - 3,4 - methylenedioxyphenethyl)amino]methyl]-4-hydroxy-m-xylene-α$^1$,α$^3$-diol in 37 ml. of tetrahydrofuran is cooled in an ice bath, and a solution of 8.4 ml. of 20% HNO$_3$ in tetrahydrofuran is added dropwise in five minutes. The solution is then tested to assure an acidic pH, after which it is diluted to 125 ml. with ether. The oily precipitate is scratched to initiate crystallization, after which the mixture is cooled. The solid is then collected, washed with ether and air-dried to yield a white solid, M.P. 92–98°.

The above solid is recrystallized several times from minimal amounts of 2-propanol. Several additional purifications are carried out where successively higher melting solid and subsequent crops are combined and recrystallized to yield a solid product which is then recrystallized several times from ethanol to eventually yield α$^1$-[[(α-methyl - 3,4 - methylenedioxyphenethyl)amino]methyl]-4-hydroxy-m-xylene-α$^1$,α$^3$-diol nitrate in the form of a white solid, M.P. 136.5–140°.

*Analysis.*—Calcd. for $C_{19}H_{24}N_2O_8$ (percent): C, 55.87; H, 5.92; N, 6.86. Found (percent): C, 55.67; H, 6.01; N, 6.62.

The mother liquors from the above recrystallizations are combined and concentrated. Additional amounts of the above-described high melting isomer are removed by recrystallizing it from 2-propanol. The product which ultimately dissolves in a minimum amount of 2-propanol is purified further by warming in small amounts of dioxane, removing the insoluble material and then recrystallizing the soluble product from dioxane to give the low melting isomer, M.P. 108.5–110°.

*Analysis.*—Calcd. for $C_{19}H_{24}N_2O_8$ (percent): C, 55.87; H, 5.92; N, 6.86. Found (percent): C, 55.67; H, 6.29; N, 6.14.

EXAMPLE 11

2-benzyloxy-5-[(3,4-methylenedioxyphenethyl)aminoacetyl]-benzyl acetate hydrochloride To a cold stirred solution of 4.61 g. (27.9 mmoles) of 3,4 - methylenedioxyphenethylamine in 9.6 ml. of THF is added dropwise a solution of 5.00 g. (13.3 mmoles) of 2-benzyloxy-5-bromoacetylbenzyl acetate in 20 ml. of THF. A precipitate forms during the addition and after the addition is complete, the mixture is stirred at room temperature for 45 minutes, cooled, diluted with 10 ml. of ether, and filtered to separate 3.17 g. (96.5%) of 3,4-methylenedioxyphenethylamine hydrobromide. The filtrate is concentrated and the residue dissolved in 10 ml. of methanol. Acidification of this solution with ethereal HCl and dilution of the resulting solution with a small amount of ether precipitates a white solid which is collected and dried to give 2-benzyloxy-5-[3,4-methylenedioxyphenethyl)aminoacetyl]benzyl acetate hydrochloride as a white solid, M.P. 186–187°.

EXAMPLE 12

2-benzyloxy-5-[(3,4-methylenedioxyphenethyl)aminoacetyl]benzyl alcohol

A mixture of 9.30 g. (18.7 mmoles) of the aminoketone hydrochloride of Example 11, 85 ml. of methanol, 9 ml. of concentrated HCl, and 103 ml. of water is stirred at 80° (under nitrogen) for 1 hour. The resulting solution is cooled, whereupon a white precipitate forms. The vigorously stirred mixture is made basic with 20% sodium hydroxide and the resulting white solid collected and dried. Recrystallization from methanol gives 2-benzyloxy-5 - [(3,4 - methylenedioxyphenethyl)aminoacetyl]benzyl alcohol as a white solid, M.P. 115–117°.

EXAMPLE 13

α$^1$-[[(3,4-methylenedioxyphenyl)amino]methyl]-4-hydroxy-m-xylene-α$^1$,α$^3$-diol A mixture of 6.32 g. (15.1 mmoles) of the aminoketone of Example 12, 0.63 g. of 10% Pd/C, and 85 ml. of methanol is hydrogenated using the Parr apparatus for a total of 17.75 hours with fresh catalyst added at the end of 7.75 hours and 12.75 hours. The resulting mixture is filtered through Celite and the filtrate concentrated to leave an orange foam which is induced to crystallize by scratching with a glass rod in the presence of ethyl acetate. A light orange solid, M.P. 117–119°, is collected and recrystallized from methanol-ethyl acetate to give α$^1$ - [[(3,4 - methylenedioxyphenethyl)amino]methyl]-4-hydroxy-m-xylene-α1,α$^3$-diol as pale tan crystals, M.P. 123.5–124.5°. An additional recrystallization from methanol-ethyl acetate yields α$^1$-[[(3,4-methylenedioxyphenethyl)amino]methyl] - 4 - hydroxy-m-xylene-α$^1$,α$^3$-diol as white crystals, M.P. 124–125°.

*Analysis.*—Calcd. for $C_{18}H_{21}NO_5$ (percent): C, 65.24; H, 6.39; N, 4.23. Found (percent): C, 65.58; H, 6.34; N, 4.12.

EXAMPLE 14

2-benzyloxy-5-[(α,α-dimethyl-3,4-methylenedioxyphenethyl)aminoacetyl]benzyl acetate hydrochloride To a stirred solution of 11.8 g. (61.3 mmoles) of α,α-dimethyl-3,4-methylenedioxyphenethylamine in 21 ml. of THF (tethydrofuran) is added dropwise a solution of 11.0 g. (29.2 mmoles) of 2-benzyloxy-5-bromoacetyl benzyl acetate in 44 ml. of THF. During the addition, the temperature of the reaction mixture is maintained at 25–30°; after the addition is completed, the solution is warmed at 35° for 1.5 hours. After one hour at 35°, the solution is seeded with a crystal of α,α-dimethyl-3,4-methylenedioxyphenethylamine hydrobromide and a white precipitate begins to form. At the end of the heating period the mixture is diluted with ether, cooled to 0° for one hour, and filtered to separate 8.00 g. (100%) of α,α-dimethyl-3,4 - methylenedioxyphenethylamine hydrobromide. The filtrate is concentrated to leave a pale yellow gum which is dissolved in an ethanol-methanol mixture and acidified with ethereal hydrochloric acid. The resulting precipitate is collected, washed with cold isopropanol, and dried to give pale yellow crystals, M.P. 214°. Recrystallization from methanol gives 2-benzyloxy-5 - [(α,α - dimethyl - 3,4 - methylenedioxyphenethyl)aminoacetyl]benzyl acetate hydrochloride as white crystals, M.P. 215°.

EXAMPLE 15

2-benzyloxy-5-[(α,α-dimethyl-3,4-methylenedioxyphenethyl)aminoacetyl]benzyl alcohol A mixture of 7.12 g. (13.5 mmoles) of the benzyl acetate of Example 14, 75 ml. of water, 85 ml. of methanol, and 6.5 ml. of concentrated hydrochloric acid is heated at 80–85° for one hour and then cooled. The oil which initially separates soon solidifies and the resulting suspension is made basic by adding 20% aqueous sodium hydroxide. The resulting solid is collected, washed thoroughly with water and air-dried. Recrystallization from methanol gives 2-benzyloxy-5-[(α,α-dimethyl-3,4-methylenedioxyphenethyl)aminoacetyl]benzyl alcohol as small white crystals, M.P. 228°.

EXAMPLE 16

α¹-[[α,α-dimethyl-3,4-methylenedioxyphenethyl)aminomethyl]-4-hydroxy-m-xylene-α¹,α³-diol A mixture of 3.50 g. (7.81 mmoles) of the aminoketone of Example 15, 0.35 g. of 10% palladium-on-carbon, and 38 ml. of methanol is hydrogenated (50 p.s.i.) using the Parr apparatus. After 7.5 hours, the mixture is filtered and concentrated to leave a gum which is dissolved in hot isopropanol; on cooling the resulting solution, white crystals form and are collected and dried to give α¹-[[(α,α - dimethyl - 3,4-methylenedioxyphenethyl)amino]methyl]-4-hydroxy-m-xylene-α¹,α3-diol, M.P. 106°.

We claim:

1. A pharmaceutical composition intended for administration to produce a bronchodilating action containing from about 0.02 mg. to about 10 mg. of a compound of the formula

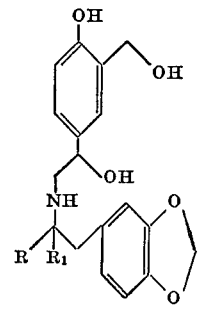

in which R and $R_1$ are hydrogen or lower alkyl, in combination with a pharmaceutical diluent.

2. A composition of claim 1 in which R and $R_1$ are hydrogen.

3. A composition of claim 1 in which R and $R_1$ are methyl.

4. A composition of claim 1 in which R is hydrogen and $R_1$ is methyl.

5. The method of producing a bronchodilation in an animal which comprises administering to said animal the equivalent of a daily dose of 2 mg./kg. to 200 mg./kg. intraperitoneally a compound of claim 1.

6. The method of producing bronchodilation in an animal which comprises administering to said animal the equivalent of a daily dose of 2 mg./kg. to 200 mg./kg. intraperitoneally a compound of claim 1 in which R is hydrogen and $R_1$ is methyl.

References Cited
UNITED STATES PATENTS 3,502,679 3/1970 Houlihan et al. __ 260—340.5 X JEROME D. GOLDBERG, Primary Examiner

PO-1050
(5/69)

UNITED STATES PATENT OFFICE
CERTIFICATE OF CORRECTION

Patent No. 3,786,154    Dated January 15, 1974

Inventor(s) John T. Suh and Thomas M. Bare

It is certified that error appears in the above-identified patent and that said Letters Patent are hereby corrected as shown below:

Column 1, lines 42-55

" 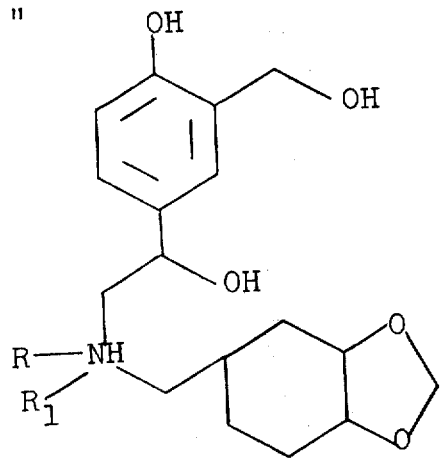 " should be -- 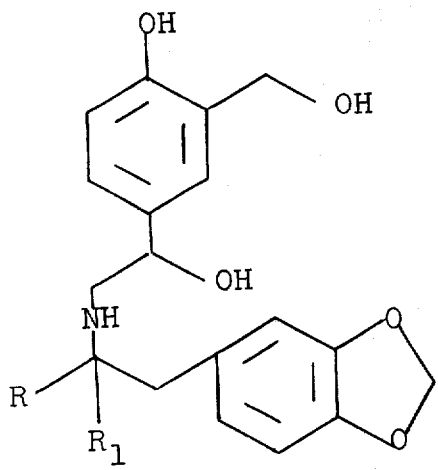 --

Signed and sealed this 2nd day of July 1974.

(SEAL)
Attest:

EDWARD M. FLETCHER, JR.
Attesting Officer

C. MARSHALL DANN
Commissioner of Patents